United States Patent

Kipping et al.

[11] Patent Number: 6,070,472
[45] Date of Patent: Jun. 6, 2000

[54] PLANARITY MEASURING ROLLER

[75] Inventors: Matthias Kipping, Herdorf; Rolf Franz, Kreuztal; Matthias Tuschhoff, Siegen; Peter Sudau, Hilchenbach, all of Germany

[73] Assignee: SMS Schloemann-Siemag Aktiengesellschaft, Düsseldorf, Germany

[21] Appl. No.: 09/019,969

[22] Filed: Feb. 6, 1998

[30] Foreign Application Priority Data

Feb. 6, 1997 [DE] Germany ............ 197 04 447

[51] Int. Cl.[7] ........................................ G01L 5/04
[52] U.S. Cl. .............................. 73/829; 72/11.7
[58] Field of Search ................. 73/812, 826, 827, 73/828, 829; 72/11.3, 11.7

[56] References Cited

U.S. PATENT DOCUMENTS

| | | | |
|---|---|---|---|
| 3,274,824 | 9/1966 | Lawson et al. | 73/829 |
| 4,392,367 | 7/1983 | Bald | 72/11.3 |
| 4,711,109 | 12/1987 | Rohde et al. | 72/11.7 |
| 4,858,333 | 8/1989 | Morel | 33/552 |
| 5,465,214 | 11/1995 | Jeuniaux et al. | 364/468.24 |
| 5,629,487 | 5/1997 | Mucke et al. | 73/818 |

FOREIGN PATENT DOCUMENTS

| | | |
|---|---|---|
| 0259107 | 3/1988 | European Pat. Off. |
| 1602146 | 5/1970 | Germany |
| 3721746 | 1/1989 | Germany |
| 1169381 | 10/1965 | United Kingdom |

*Primary Examiner*—Max Noori
*Attorney, Agent, or Firm*—Friedrich Kueffner

[57] ABSTRACT

An arrangement for measuring the planarity of a rolled strip which is under tension in a hot strip rolling train with a roughing train and a finishing train including several roll stands and a reel. At least one measuring roller is arranged in rolling direction between the first roll stand of the finishing train and the reel, wherein the rolled strip is guided over each measuring roller, so that the measuring roller is bent as a result of the strip tension; in addition, pick-ups for measuring bending of the measuring roller are provided.

16 Claims, 3 Drawing Sheets

PLANARITY MEASURING ROLLER

BACKGROUND OF THE INVENTION

1. Field of the Invention

The present invention relates to an arrangement for measuring the planarity of a rolled strip which is under tension in a hot strip rolling train with a roughing train and a finishing train including several roll stands and a reel. In addition, the present invention relates to measuring rolls which are used in such an arrangement.

2. Description of the Related Art

Planarity deviations of rolled strips are caused by length differences over the width of the strip. Since the strip is under tension, length differences are at least partially compensated by elastic elongation. Accordingly, a direct measurement of the length differences is not possible. However, for determining the planarity errors, it is possible to utilize the tensile stress distribution which is dependent on the length differences.

In cold-rolled strips, for example, guide rollers are used for determining planarity deviations. The tension-proportional deflection force during the deflection of the strip is utilized as the measurement value.

DE 37 21 746 A1 discloses a method and a device for measuring the planarity of a rolled strip which is under tension in wide strip hot rolling trains. The tension distribution in the rolled strip is measured in segmented tension measuring rollers and the planarity of the strip is determined indirectly in this manner. However, in such segmented rollers, there is the great danger that the gaps of these rollers which are used and operate in aggressive media become clogged, so that the operation is significantly impaired.

SUMMARY OF THE INVENTION

Therefore, it is the primary object of the present invention to propose an arrangement and a measuring roller which are based on an alternative measuring principle and which do not have the disadvantages of known devices.

In accordance with the present invention, in an arrangement of the above-described type, at least one measuring roller is arranged in rolling direction between the first roll stand of the finishing train and the reel, wherein the rolled strip is guided over each measuring roller, so that the measuring roller is bent as a result of the strip tension; in addition, pick-ups for measuring bending of the measuring roller are provided.

The arrangement according to the present invention can be used with particular advantage when rolling very thin strips.

In accordance with an advantageous feature, one or more measuring rollers are arranged between the roll stands of the finishing train and/or in rolling direction behind the last roll stand of the finishing train and/or in front of a drive apparatus for the reel and/or between the drive apparatus and the reel.

Depending on the arrangement of one or more measuring rollers, the measurement values obtained from the measuring rollers can be utilized for displacing the rolls of the roll stands in axial direction, for changing the bending of the rolls, and for pivoting adjusting systems of the roll stands. Moreover, by a special arrangement of the measuring rollers, it is also possible to influence the cooling of the rolled strip and/or of the work rolls.

For example, if a measuring roller is arranged between the drive apparatus and the reel, a measurement value obtained from this measurement roller can be utilized for pivoting the drive apparatus. As a result of this measure, it is possible-to regulate the strip travel during coiling onto the reel mandrel.

If the drive apparatus for the reel is arranged in the conventional manner behind the strip cooling unit, a measuring roller arranged in front of the drive apparatus for the reel can measure the influence of the strip cooling unit and can reregulate the strip cooling unit as necessary.

Each measurement pick-up can be reliably protected against external influences if the elastically bendable measuring roller is hollow and is rotatably mounted in stationary bearings and if a support for at least one measurement pick-up extending in axial direction is arranged in the interior of the measuring roller and concentrically to the axis of the unloaded measuring roller.

The support for the measurement pick-up is dimensioned in such a way that the hollow space between the support and the inner circumferential surface of the measuring roller is sufficient to allow and unimpeded bending of the elastic measuring roller.

In accordance with a preferred feature, distance pick-ups measure the bending of the measuring roller relative to the straight support. Even more precise conclusions concerning the planarity of the strip can be made if the stationary bearings of the measuring roller are mounted in bearing blocks on which force measuring devices are arranged. These force measuring devices are advantageously of such a type that they can determine the forces in several directions.

In accordance with another feature, a plurality of measurement pick-ups, particularly distance measuring devices, are arranged spaced apart in axial direction of the support and distributed uniformly over the circumference thereof. This makes it possible to produce several measurement values at each location of the measuring roller and to form a mean value of the measuring values. Forming the mean value increases the measurement accuracy and the reliability. It is usually sufficient to provide always two oppositely located measurement pick-ups at several locations.

By providing the support for the measurement pick-ups with a passage in axial direction with connections to the measurement pick-ups, it is possible to accommodate the supply lines for the pick-ups in a protected manner within the support.

Instead of electric measurement pick-ups, it is also possible to carry out a distance measurement, for example, by means of a laser. A glass fiber line can then be used as a signal line.

Based on the pressure drop in a hydrostatic system, it is possible to make conclusions concerning bending of the roller and, thus, the strip planarity if the elastically bendable measuring roller is hollow and is rotatably mounted in stationary bearings, and if a shaped body with passages for a hydrostatic medium extends in the interior of the measuring roller, wherein the passages are at least partially in communication with a hollow space formed between the measuring roller and the shaped body and at least one flow measuring device is connected to the passages (for example, direct measurement by means of propellers or ultrasound; pressure drop through a throttle). The volumetric flow in the passages of the shaped body changes in dependance on the tension of the strip. In this embodiment of the invention, the volumetric flow can be measured in an advantageous manner outside of the measuring roller by means of the flow measuring device without being influenced by the heat of the strip. As a side effect, the hydrostatic medium discharges heat to the measuring roller. Moreover, the hollow measuring roller which is usually constructed with thin walls and is elastically bendable is effectively supported by the hydrostatic medium in the area where the strip rests on the roller.

Suitable hydrostatic media have been found to be, for example, oil, water, but also air.

For increasing the measuring accuracy, the passages for the hydrostatic medium are preferably widened pocket-shaped in the areas of their openings.

Preferably, a plurality of pocket-shaped or funnel-shaped widened openings of the passages are arranged over the width of the measuring roller.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
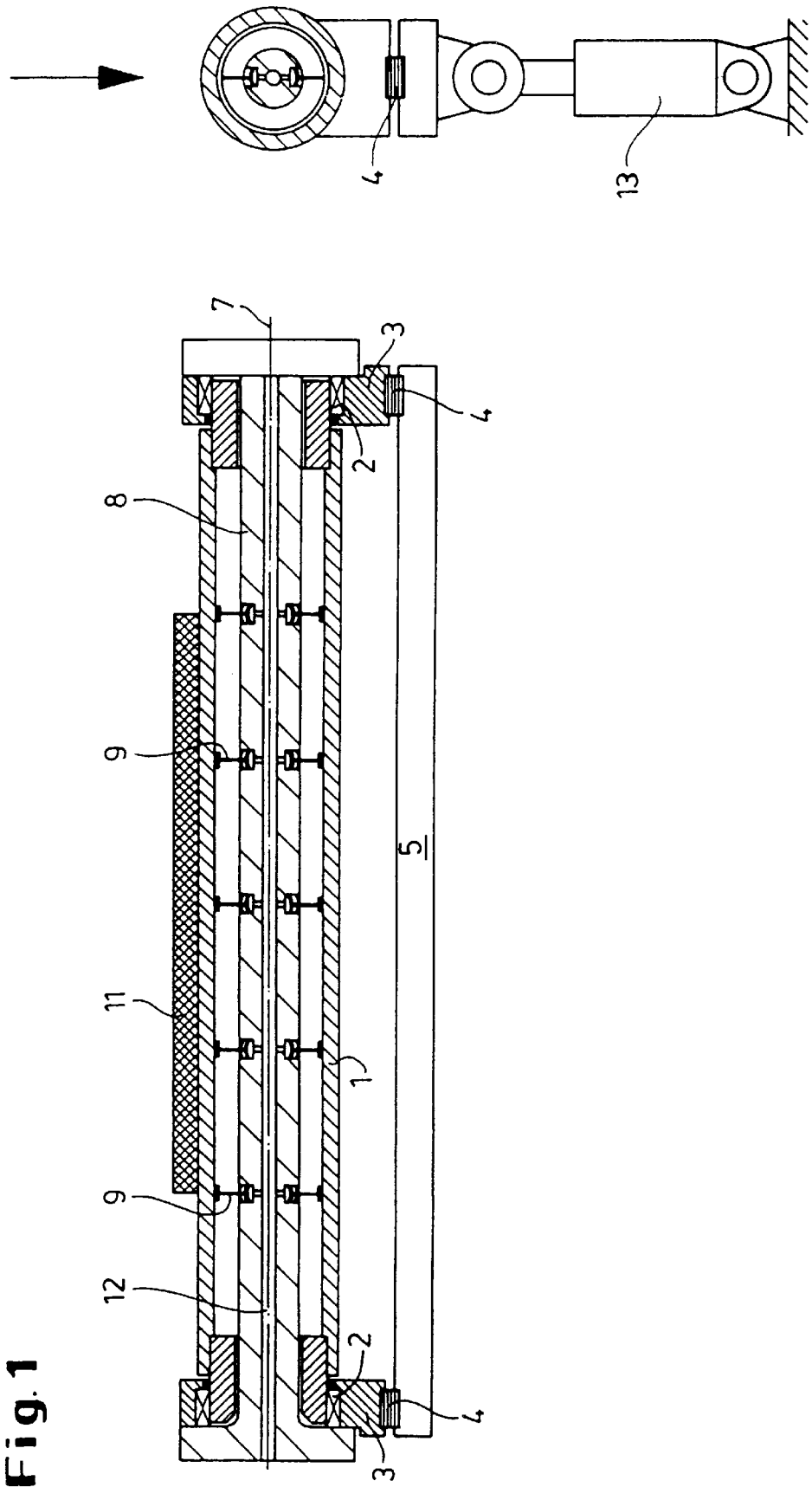
FIG. 1 shows a longitudinal sectional view and a transverse sectional view of a measuring roller with distance measuring systems arranged in the interior of the measuring roller.

As shown in FIG. 1 of the drawing, an elastically bendable measuring roller 1 is supported on two spherical or self-aligning roller bearings 2 which are supported on bearing blocks 3. The bearing blocks 3 rest on a crossbeam 5. A force measuring device 4 each is mounted between the bearing blocks 3 and the crossbeam 5.

A support 8 extends in the interior of the measuring roller 1 concentrically and in the direction of an axis 7 of the measuring roller shown in the unloaded state in FIG. 1. The support 8 is also supported on the bearing block 3.

Distance measuring systems 9 are arranged on the support 8 regular intervals over the width of the roller 1. From the different signals of the distance measuring systems 9, a computer, not shown in the drawing, can determine the bending line of the roller 1 under the load of a strip 11. By arranging always two distance measuring devices 9 opposite each other, it is possible to pick up always two measurement values at one location of the roller 1 and to form an average therefrom. This increases the measuring accuracy and reliability. Electric connecting lines, not shown in the drawing, to the distance measuring systems 9 extend through a passage 12 in axial direction of a support 8.

From the bending line and the signals of the force measuring devices 4, it is possible to reliably make conclusions concerning the stress distribution in the strip 11 and, thus, the planarity thereof.

In this embodiment, it is particularly to be pointed out that the distance measuring systems 9 are arranged in a protected manner in the interior of the roller 1.

The side view of the measuring roller 1 in FIG. 1 shows that the crossbeam 5, which holds the bearing blocks 3 in a stationary manner, is itself arranged on a hydraulic cylinder 13 which presses the roller 1 from below against the strip 11. In an alternative embodiment, the crossbeam 5 can be mounted so as to be movable, so that, in that case, the roller 1 can be moved into the strip travel and can preferably be moved into a protected position at the strip beginning and the strip end.

Figure 2:
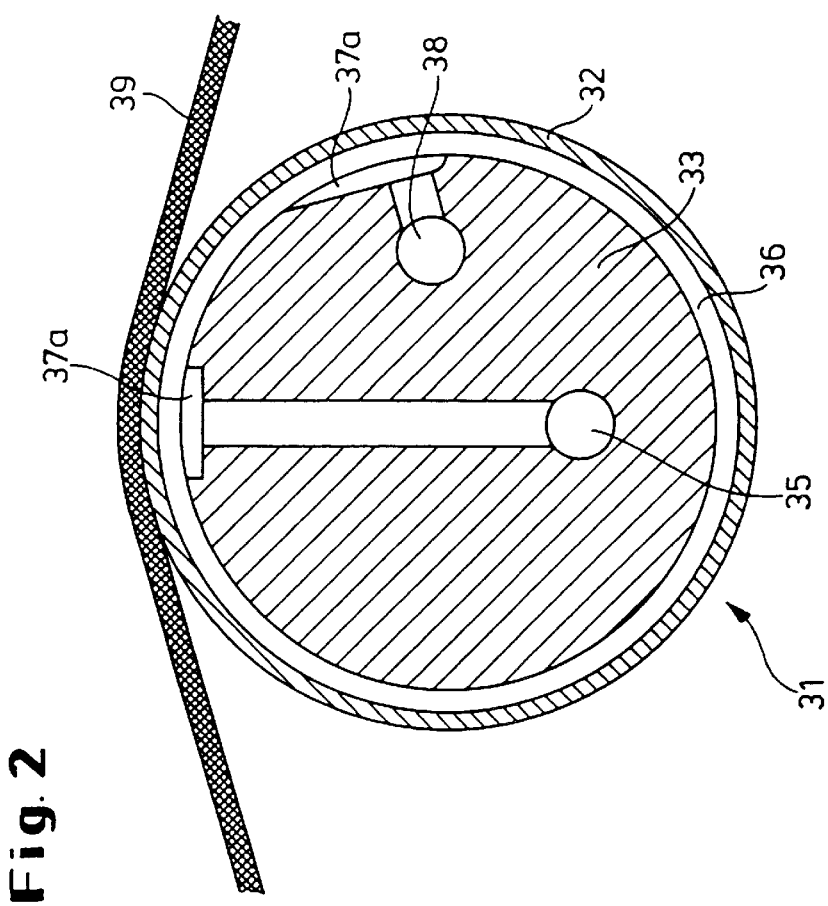
FIG. 2 are sectional views of a measuring roller with hydrostatic support.

FIG. 2 of the drawing shows a measuring roller 31 with a hydrostatic system for picking up the measurement values.

Figure 3:
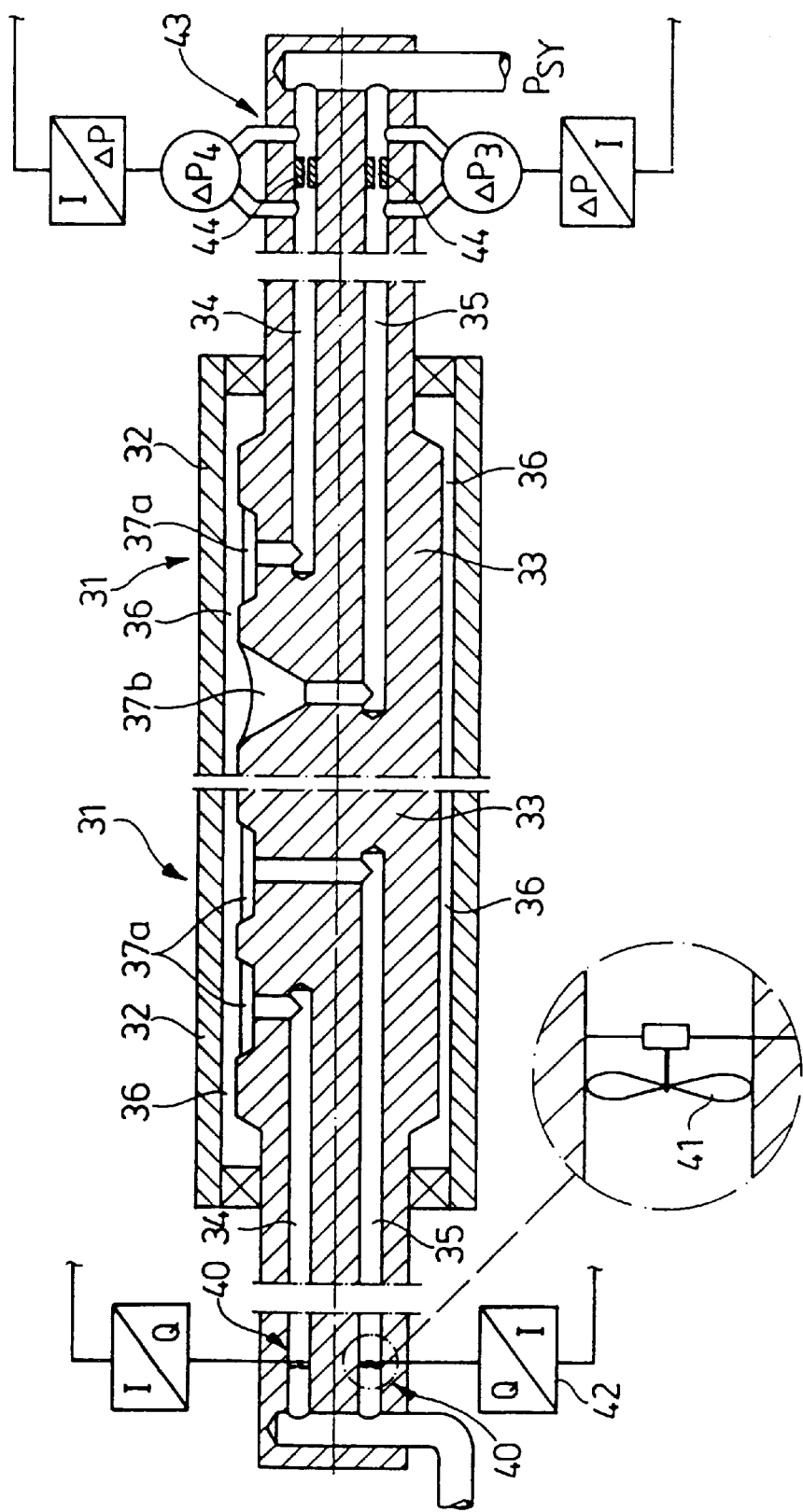
FIG. 3 is a longitudinal sectional view of a measuring roller in accordance with FIG. 2, wherein the right half schematically shows a flow measurement through a differential pressure and the left half shows a direct flow measurement.

An elastically bendable roller 32 has a hollow interior and is rotatably mounted on stationary bearings, not shown in FIG. 2. A cylindrically shaped body 13 is arranged coaxially to the roller 32 in the interior of the measuring roller 32. Axially extending through the shaped body 33 are several passages 34, 35 which at their end portions extend at a right angle and lead into a hollow space 36 formed between the measuring roller 32 and the shaped body 33. In the areas of the openings, the passages 34, 35 are widened in the form of pockets 37a, as shown in FIG. 2, or in the form of funnels 37b, as shown in FIG. 3. Another passage 38 serving to discharge the supplied hydrostatic medium is arranged laterally of the passages 34, 35 for supplying the hydrostatic medium which are arranged in a cascade-like manner. The passage 38 serving for discharging the hydrostatic medium is also widened in the shape of a pocket in the area of its opening into the hollow space 36.

The strip 39 guided over the roller 32 causes the roller 32 which has a relatively thin wall to bend. When hydrostatic medium flows through the passages 34, 35, bending is reduced. The change of the flow is a measure for the tension of the strip 39 acting in the area of pocket 37a or of each funnel 37b. The change of flow can be measured directly or can be determined from the pressure drop at a throttle point; both possibilities are shown in FIG. 3. The directly operating flow measuring device 40 as shown in the left half of FIG. 3 includes propellers 41 in the passages 34, 35 and the flow quantity determined by the propellers is converted in a transducer 42 into an electrical signal for the control. Alternatively, for example, an ultrasonic measurement is also possible. Another flow measuring device 43 is shown in the right half of FIG. 3. In that case, throttles 44 are provided in the passages 34, 35, wherein the throttles 34 determine a flow change from the differential pressure which is supplied to the control from the transducers 42 in the form of an electrical signal. The hydrostatic medium simultaneously serves to cool the measuring roller 32 and the strip 38.

While specific embodiments of the invention have been shown and described in detail to illustrate the inventive principles, it will be understood that the invention may be embodied otherwise without departing from such principles.

We claim:

1. An arrangement for measuring the planarity of rolled strip which is under tension in a hot strip rolling train including a roughing train and a finishing train with a plurality of roll stands and a reel, the arrangement comprising at least one measuring roller arranged in a rolling direction between a first roll stand of the finishing train and the reel, wherein the at least one measuring roller is mounted such that the strip is guided over the at least one measuring roller, further comprising measuring pick-ups for measuring bending of the at least one measuring roller, wherein the elastically bendable measuring roller is hollow and is rotatably mounted in stationary bearings, a shaped body extending in an interior of the measuring roller, the shaped body having passages for a hydrostatic medium, wherein the passages lead at least partially into a hollow space formed between the measuring roller and the shaped body, and at least one flow measuring device connected to the passages.

2. The arrangement according to claim 1, comprising at least one measuring roller between the roll stands of the finishing train.

3. The arrangement according to claim 1, comprising at least one measuring roller in the rolling direction behind the last roll stand of the finishing train.

4. The arrangement according to claim 1, comprising at least one measuring roller in front of a drive apparatus for the reel.

5. The arrangement according to claim 1, comprising at least one measuring roller between a drive apparatus for the reel and the reel.

6. The arrangement according to claim 1, comprising means for utilizing measurement values obtained from the measuring roller for displacing the rolls of the roll stands in axial direction, for changing bending of the rolls and for pivoting adjusting systems of the roll stands.

7. The arrangement according to claim 1, comprising at least one measuring roller between the drive apparatus for the reel and the reel, further comprising means for utilizing a measurement value obtained from the at least one measuring roller between the drive apparatus and the reel for pivoting the drive apparatus.

8. The arrangement according to claim 1, wherein the elastically bendable measuring roller is a hollow roller and is rotatably mounted in stationary bearings, wherein a support for at least one measurement pick-up is arranged in axial direction in the interior of the measuring roller extending concentrically to an axis of the unloaded measuring roller.

9. The arrangement according to claim 1, wherein the measurement pick-up is a distance measuring device.

10. The arrangement according to claim 8, wherein the stationary bearings are mounted in bearing blocks, further comprising force measuring devices arranged in the bearing blocks.

11. The arrangement according to claim 8, comprising a bending-stiff crossbeam connected to the bearing blocks for holding apart the bearing blocks.

12. The arrangement according to claim 8, comprising a plurality of measuring pick-ups arranged spaced apart in axial direction of the support and uniformly distributed over the circumference of the support.

13. The arrangement according to claim 8, comprising a measuring device for measuring forces in several directions.

14. The arrangement according to claim 8, wherein the support comprises a passage extending in axial direction with connections to the measurement pick-ups.

15. The arrangement according to claim 1, wherein at least one passage is configured as a supply passage.

16. The arrangement according to claim 1, wherein the passages have in areas of openings thereof pocket-shaped or funnel-shaped widened portions.

\* \* \* \* \*